ELECTRIC GENERATING AND AIR COOLING SYSTEM
Original Filed Jan. 18, 1954
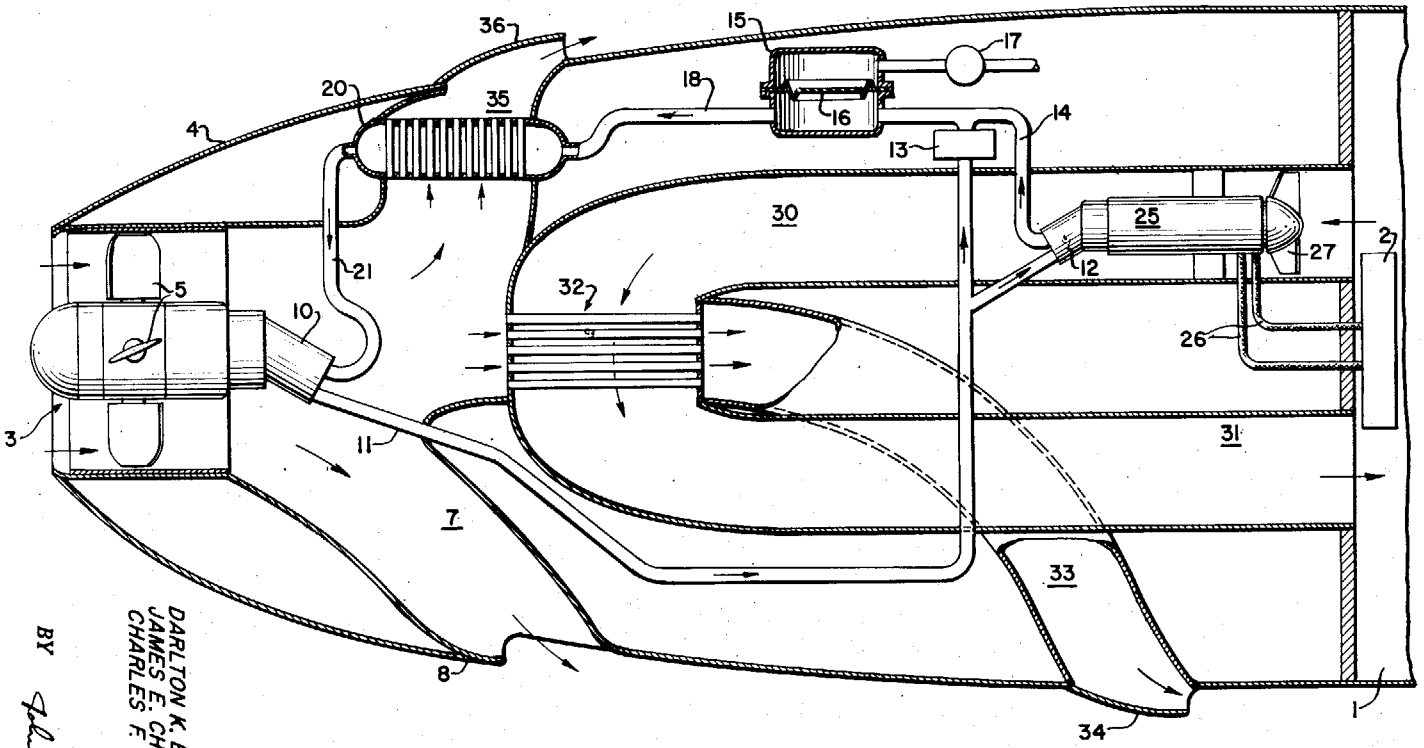
DARLTON K. BREAUX,
JAMES E. CHAPMAN,
CHARLES F. DREXEL,
INVENTORS.
BY John H. T. Wallace United States Patent Office Re. 24,179
Reissued July 10, 1956

24,179

ELECTRIC GENERATING AND AIR COOLING SYSTEM

Darlton K. Breaux, Torrance, James E. Chapman, Los Angeles, and Charles F. Drexel, Palos Verdes Estates, Calif., assignors to The Garrett Corporation, Los Angeles, Calif., a corporation of California Original No. 2,706,255, dated April 12, 1955, Serial No. 404,752, January 18, 1954. Application for reissue August 10, 1955, Serial No. 527,663

23 Claims. (Cl. 290—4)

Matter enclosed in heavy brackets [ ] appears in the original patent but forms no part of this reissue specification; matter printed in italics indicates the additions made by reissue.

This invention relates generally to air cooling and power generating systems, and particularly relates to a system for generating [electric] power for airborne [electric] equipment and for *circulating and* cooling the air in a closed compartment of the aircraft which houses the [electric] equipment.

[The system of] *While* the present invention [is intended for use] *has particular utility* in connection with an aircraft having a closed compartment which contains electric equipment such [, for example,] as a transmitter or receiver for navigational purposes [.] *, and is hereinafter shown and described as embodied in such an installation, it is to be understood that its utility is not limited thereto. The invention, for example, has utility in connection with an aircraft having a closed compartment containing any type of power equipment in which a* [A] portion of the [electric] power supplied to the equipment will be converted into heat which has to be conducted away to prevent excessive heating.

[Furthermore, the] *In the present embodiment, the closed compartment, for example, may contain* electric equipment [which will normally include, for example, electric] *such as* transformers and capacitors *which* must be maintained approximately at atmospheric pressure to prevent arcing of such components. Hence it will be obvious that, *in this embodiment,* it is necessary to provide both an electric generator for supplying power to the electric equipment and means for cooling a gas such as air in the compartment which houses such equipment. On the other hand, since such a compartment is not occupied by persons, the temperature of the compartment may be relatively high, and it is possible to recirculate the same air since its composition is of little importance.

In [accordance with] the present *embodiment of the* invention, [the] *wherein an* electric generator is driven by a ram air turbine exposed to the air stream of the aircraft [. It] *, it* is [necessary] *desirable* to maintain the output voltage and frequency of the electric generator within predetermined relatively narrow limits. [and this cannot be achieved by driving the generator directly by the ram air. This is so because] *Since* the speed of a conventional ram air turbine cannot be controlled within sufficiently narrow limits to control the generator output voltage, as well as the frequency of the generated power [. Hence, in accordance with the present invention], the electric generator *in the present embodiment* is *shown as* driven indirectly by the ram air turbine through a hydraulic system, including a hydraulic pump and a hydraulic motor. The speed of the hydraulic motor, *in this system,* may readily be controlled within the desired limits. *It is to be understood, however, that in other embodiments of the invention where the power generating means need not be controlled within narrow limits and the variation in the speed of the ram air turbine is therefore not critical, it will not be necessary to drive the power generating means indirectly through a hydraulic system and various other direct or indirect connecting means may be utilized to couple the power generating means to the ram air turbine.*

It is accordingly an object of the present invention to provide a system for generating [electric] power and for *circulating and* cooling a gas such as air for a closed compartment of an aircraft.

A further object of the invention is to provide a system for delivering electric power having a voltage which does not vary beyond predetermined limits, in spite of wide changes of the speed of the aircraft and of the resulting relative air stream.

Another object of the invention is to provide a system for generating [electric] power for airborne [electric] equipment, the system including means for cooling hydraulic fluid used for transmitting power from the prime mover to the *point of use* [electric generator] and for *circulating and* cooling the air of the compartment housing the [electric] equipment substantially without requiring additional power.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which the single figure is a schematic view of the power generating and air cooling system of the present invention.

Referring now to the drawing, there is illustrated schematically a system in accordance with the present invention for air or gas cooling a closed compartment 1 which may form part of an aircraft or which may depend from the aircraft in the form of a conventional pod. Contained within the compartment is electric equipment, schematically indicated at 2, which has to be supplied with electric power. Furthermore, to prevent arcing of the electric equipment, the air or gas in the compartment should be maintained at approximately atmospheric pressure and should be cooled to remove the heat generated by the electric power. To this end, there is provided a self-governing ram air turbine, generally indicated at 3, which is located in the nose portion 4 of the pod. The ram air turbine 3 preferably is an axial flow turbine as shown and is provided with blades 5. The turbine is caused to rotate by the dynamic forces created by the forward motion of the aircraft. The ram air turbine is exposed to the air stream of the aircraft and the main portion of the air discharged by the turbine is ducted overboard through a duct 7. Preferably, a wind screen 8 is provided adjacent to the outer skin of the nose portion 4 and partially covers the exit opening of the outlet duct 7 to create better aerodynamic flow and to assist in the discharge of the air.

A hydraulic pump 10, which may be of the positive displacement type or variable volume, is associated with and driven by the turbine 3 and discharges a hydraulic fluid, such as oil, under pressure through a tube 11. The tube 11 conducts the compressed oil to a hydraulic motor 12 which may also be of the positive displacement type and has an integral speed control. The speed control is designed to limit the speed of the motor 12 to a predetermined value, preferably within ±3%. Since the speed control senses fluid flow, the motor preferably is operated in conjunction with a pressure relief and/or unloading valve 13 which bypasses the motor. Thus, the bypass valve 13 connects the tube 11 to a tube 14 which provides a discharge path for the oil and which is connected to a pressurized sump 15. The pressurized sump may have a construction similar to that of a gas accumulator and may contain a gas-filled bag or a diaphragm 16 as shown, which divides the sump into a lower and an upper chamber. The gas pressure in the upper chamber may be controlled by a valve 17. The sump 15 serves the purpose of determining a low pressure level for the hydraulic system and also maintains supercharge pressure for the pump 10. The oil is discharged from sump 15 through a tube 18 which connects the sump to an oil-to-air heat exchanger 20. The oil flows through the heat exchanger in a tortuous path, while cooling air is passed through the tubes of the heat exchanger in a manner to be described hereinafter. The oil which has been cooled by the heat exchanger 20 is returned to the hydraulic pump through a tube 21.

The hydraulic motor 12 may be coupled through a clutch to an electric alternating current generator 25 which may be of the induction type so that the generator may be operated as an induction motor by supplying it with electric power. Regardless of whether the unit 25 is used as a generator or as a motor, it will have the same direction of rotation. The electric power developed by the generator 25 is obtained from output leads 26, which in turn are connected to the electric equipment 2, as indicated schematically. Since the speed of the hydraulic motor 12 may be maintained within the desired limits, the output voltage developed by the generator will also be maintained within the proper limits as will the frequency of the alternating current power.

A fan 27 is mounted on and driven with the generator 25, preferably through a gear train. The fan 27 may be an axial flow fan, as shown, and serves the purpose of recirculating a suitable gas, such as nitrogen, hydrogen or air, through the compartment. To this end, the fan 27 is mounted in a duct 30 connected to the compartment 1 and having an outlet portion 31 which will return the air or other gas into the compartment 1. The compartment 1 and the duct 30, 31 form a closed system so that the air pressure may be maintained substantially constant after the compartment has been closed.

An air-to-air heat exchanger 32 is mounted in the duct 30 and serves the purpose of cooling the air for the compartment. The compartment air is cooled by cooling air which may conveniently be obtained from the air discharged from the turbine 3. Thus, a portion of the air discharged from the turbine flows through the heat exchanger 32 and may be ducted overboard by an outlet duct 33. The outlet duct 33 may again be provided with a suitable wind screen 34 to improve the aerodynamic flow. Another portion of the air discharged by turbine 3 is conducted through the tubes of the oil-to-air heat exchanger 20 and is, in turn, ducted overboard through a discharge duct 35 which may also be provided with a wind screen 36.

The system, as described, operates as follows: When the airplane is in flight, the air stream to which the turbine is exposed will drive the turbine 3 and the hydraulic pump 10 to supply oil under pressure to the hydraulic motor 12, which in turn drives the generator 25 and controls its speed. Hence, electric power is supplied to the electric equipment. The oil from the motor 12 is returned through the pipe 14 into the sump 15 and, hence, through the heat exchanger 20 back to the pump 10. If the generator load should decrease, or if the speed of the turbine should increase, a portion of the compressed oil will be bypassed through the pressure relief valve 13 into the oil return pipe 14. Hence, a portion of the oil is relieved at high pressure which tends to increase the temperature of the oil. The temperature of the oil also tends to increase due to unavoidable, small friction losses. Accordingly, the oil is cooled in the oil-to-air heat exchanger 20 by a portion of the discharged turbine air flowing through the tubes of the heat exchanger. This will maintain the oil temperature below a predetermined limit, which may be of the order of 185° F.

The air or gas in the compartment is circulated through the duct 30 by the axial flow fan 27. This air is cooled by the air-to-air heat exchanger 32 which may, for example, maintain the air of the compartment at a temperature of approximately 185° F. or less, assuming a turbine inlet temperature of 146° F. The generator 25 may be designed to supply 2,200 watts of electric power. It will be understood that only a small portion of the air discharged from the turbine will be utilized for supplying cooling air to the heat exchangers 20 and 32, so that the major portion of the air will be ducted overboard through the discharge duct 7. However, since the air which is discharged by the turbine is readily available, substantially no additional power is required for cooling the two heat exchangers 20 and 32.

If air is used, the compartment 1 is preferably pressurized simply by closing it tightly before the aircraft takes off, so that the compartment is approximately at atmospheric pressure, or additional air or whatever gas is being used may be supplied to it while in flight. The system of the invention will not supply any power while the aircraft is on the ground, but it is feasible to supply electric power to the electric equipment by means of a generator on the ground. In order to operate the fan 27 under these conditions, electric power may be supplied to the generator 25 which then operates as an induction motor to drive the fan, the hydraulic motor 12 being unloaded during this operation by the bypass valve 13.

What is claimed is:

1. An electric power generating and gas cooling system for a closed compartment in an aircraft, the compartment containing electric equipment, said system comprising a ram air turbine exposed to the air stream of the aircraft, a hydraulic pump driven by said turbine for supplying a hydraulic fluid under pressure, a hydraulic motor, means connecting said pump to said motor for supplying hydraulic fluid under pressure to said motor and for returning the hydraulic fluid to said pump, an electric generator coupled to said motor and driven thereby, said generator supplying electric power to the electric equipment whereby the equipment tends to be heated, a fan for circulating gas coupled to said generator and driven therewith, duct means for recirculating gas from the compartment past said fan, and gas cooling means in said duct means.

2. An electric power generating and air cooling system for a closed compartment in an aircraft, the compartment containing electric equipment, said system comprising a ram air turbine exposed to the air stream of the aircraft, a hydraulic pump driven by said turbine for supplying a hydraulic fluid under pressure, a hydraulic motor, means connecting said pump to said motor for supplying hydraulic fluid under pressure to said motor and for returning the hydraulic fluid to said pump, an electric generator coupled to said motor and driven thereby, said generator supplying electric power to the electric equipment, whereby the equipment tends to be heated, an air circulating fan coupled to said generator and driven therewith, duct means for circulating air from the compartment past said fan, a heat exchanger in said duct means for cooling the recirculated compartment air, and additional duct means for conveying a portion of the air discharged by said turbine to said heat exchanger to supply cooling air thereto.

3. An electric power generating and air cooling system for a closed compartment in an aircraft, the compartment containing electric equipment, said system comprising a ram air turbine exposed to the air stream of the aircraft, a hydraulic pump driven by said turbine for supplying a hydraulic fluid under pressure, a hydraulic motor, means connecting said pump to said motor for supplying hydraulic fluid under pressure to said motor, a return connection for returning the hydraulic fluid from said motor to said pump, a heat exchanger in said return connection, duct means for conveying a portion of the air discharged by said turbine to said heat exchanger to supply cooling air thereto, an electric generator coupled to said motor and driven therewith, said generator supplying electric power to the electric equipment, whereby the equipment tends to be heated, an air circulating fan coupled to said generator and driven thereby, additional duct means for recirculating air from the compartment past said fan, and air cooling means in said additional duct means.

4. A system for generating electric power for electric equipment and for cooling the air in a closed compartment of an aircraft, the electric equipment being housed in the compartment and tending to be heated by electric power supplied thereto, said system comprising a ram air turbine exposed to the air stream of the aircraft, a hydraulic pump driven by said turbine for supplying a hydraulic fluid under pressure, a hydraulic motor driven by the hydraulic fluid under pressure, means connecting said pump to said motor for delivering the hydraulic fluid under pressure to said motor, an electric generator driven by said motor, said generator supplying electric power to the equipment in the compartment, a return connection for the hydraulic fluid from said motor to said pump, a first heat exchanger in said return connection, first duct means for conveying a portion of the air discharged by said turbine to said first heat exchanger to provide cooling air therefor, thereby to cool the hydraulic fluid, a fan driven with said generator, second duct means for recirculating air from the compartment, said fan being disposed in said second duct means, a second heat exchanger in said second duct means for cooling the compartment air heated by the equipment, and third duct means for conveying another portion of the air discharged by said turbine to said second heat exchanger to provide cooling air therefor, thereby to cool the compartment air.

5. A system for generating electric power for electric equipment and for cooling the air in a closed compartment of an aircraft, the electric equipment being housed in the compartment and tending to be heated by electric power supplied thereto, said system comprising a ram air turbine exposed to the air stream of the aircraft, a hydraulic pump driven by said turbine for supplying a hydraulic fluid under pressure, a hydraulic motor driven by the hydraulic fluid under pressure, means connecting said pump to said motor for delivering the hydraulic fluid under pressure to said motor, an electric generator driven by said motor, said generator supplying electric power to the equipment in the compartment, said motor including means for controlling the speed of said generator within predetermined limits, a return connection for hydraulic fluid from said motor to said pump, a valve means for bypassing hydraulic fluid directly from said pump to said sump, a first heat exchanger in said return connection, first duct means for conveying a portion of the air discharged by said turbine to said first heat exchanger to provide cooling air therefor, thereby to cool the hydraulic fluid, a fan driven with said generator, second duct means for recirculating air from the compartment, said fan being disposed in said second duct means, a second heat exchanger in said second duct means for cooling the compartment air heated by the equipment, and third duct means for conveying another portion of the air discharged by said turbine to said second heat exchanger to provide cooling air therefor, thereby to cool the compartment air.

6. A system for generating electric power for electric equipment and for cooling the air in a closed compartment of an aircraft, the electric equipment being housed in the compartment and tending to be heated by electric power supplied thereto, said system comprising a ram air turbine exposed to the air stream of the aircraft, a hydraulic pump driven by said turbine for supplying a hydraulic fluid under pressure, a hydraulic motor driven by the hydraulic fluid under pressure, means connecting said pump to said motor for delivering the hydraulic fluid under pressure to said motor, an electric generator driven by said motor, said generator supplying electric power to the equipment in the compartment, said motor including means for controlling the speed of said generator within predetermined limits, a return connection for the hydraulic fluid from said motor to said pump, a pressurized sump in said return connection, valve means for bypassing hydraulic fluid directly from said pump to said sump, a heat exchanger in said return connection, first duct means for conveying a portion of the air discharged by said turbine to said first heat exchanger to provide cooling air therefor, thereby to cool the hydraulic fluid, a fan driven with said generator, second duct means for recirculating air from the compartment, said fan being disposed in said second duct means, and means for cooling the compartment air heated by the equipment.

7. A system for generating electric power for electric equipment and for cooling the air in a closed compartment of an aircraft, the electric equipment being housed in the compartment and tending to be heated by electric power supplied thereto, said system comprising a ram air turbine exposed to the airstream of the aircraft, a hydraulic pump driven by said turbine for supplying a hydraulic fluid under pressure, a hydraulic motor driven by the hydraulic fluid under pressure, means connecting said pump to said motor for delivering the hydraulic fluid under pressure to said motor, an electric generator driven by said motor, said generator supplying electric power to the equipment in the compartment, said motor including means for controlling the speed of said generator within predetermined limits, a return connection for the hydraulic fluid from said motor to said pump, a pressurized sump in said return connection, valve means for bypassing hydraulic fluid directly from said pump to said sump, a first heat exchanger in said return connection, first duct means for conveying a portion of the air discharged by said turbine to said first heat exchanger to provide cooling air therefor, thereby to cool the hydraulic fluid, a fan driven with said generator, second duct means for recirculating air from the compartment, said fan being disposed in said second duct means, a second heat exchanger in said second duct means for cooling the compartment air heated by the equipment, and third duct means for conveying another portion of the air discharged by said turbine to said second heat exchanger to provide cooling air therefor, thereby to cool the compartment air.

*8. A circulating system for the atmosphere in a closed compartment of an aircraft, said system comprising: a ram air turbine exposed to the air stream of the aircraft; a fluid pumping means driven by said turbine; fluid motor means arranged to be driven by said pumping means; a circulating fan coupled to said motor means and driven thereby; and duct means extending from the compartment to said fan and back to the compartment, whereby said fan may recirculate the atmosphere within the compartment.*

*9. A cooling system for the atmosphere in a closed compartment of an aircraft, said system comprising: a ram air turbine exposed to the air stream of the aircraft; a fluid pumping means driven by said turbine; fluid motor means arranged to be driven by said pumping means; a circulating fan coupled to said motor means and driven thereby; duct means extending from the compartment to said fan and back to the compartment, whereby said fan may recirculate the atmosphere within the compartment; and cooling means in said duct means.*

*10. A cooling system for the atmosphere in a closed compartment of an aircraft, said system comprising: a ram air turbine exposed to the air stream of the aircraft; a fluid pumping means driven by said turbine; fluid motor means arranged to be driven by said pumping means; a circulating fan coupled to said motor means and driven thereby; duct means extending from the compartment to said fan and back to the compartment whereby said fan*

*may recirculate the atmosphere within the compartment; a heat exchanger in said duct means for cooling the recirculated compartment air; and additional duct means for conveying a portion of the air discharged by said turbine to said heat exchanger to supply cooling air thereto.*

*11. A system for cooling the atmosphere within a compartment of an aircraft and for generating power, the compartment containing power actuated equipment, said system comprising: a ram air turbine exposed to the air stream of the aircraft; a fluid pumping means driven by said turbine; fluid motor means arranged to be driven by said pumping means; power generating means coupled to said motor means and driven thereby, said power generating means supplying power to the equipment in the compartment; a circulating fan coupled to said power generating means and driven thereby; duct means extending from the compartment to said fan and back to the compartment whereby said fan may recirculate the atmosphere within the compartment; and cooling means in said duct means.*

*12. A system for cooling the atmosphere within a compartment of an aircraft and for generating power, the compartment containing power actuated equipment, said system comprising: a ram air turbine exposed to the air stream of the aircraft; a fluid pumping means driven by said turbine; fluid motor means arranged to be driven by said pumping means; power generating means coupled to said motor means and driven thereby, said power generating means supplying power to the equipment in the compartment; a circulating fan coupled to said power generating means and driven thereby; duct means extending from the compartment to said fan and back to the compartment whereby said fan may recirculate the atmosphere within the compartment; a heat exchanger in said duct means for cooling the recirculated compartment air; and additional duct means for conveying a portion of the air discharged by said turbine to said heat exchanger to supply cooling air thereto.*

*13. A system for cooling the atmosphere within a compartment of an aircraft and for generating power, the compartment containing power actuated equipment, said system comprising: a ram air turbine exposed to the air stream of the aircraft; a fluid pumping means driven by said turbine for supplying fluid under pressure; fluid motor means; means connecting said pumping means to said motor means for supplying said fluid under pressure to said motor means; a return connection for returning the fluid from said motor means to said pumping means; a first heat exchanger in said return connection; first duct means for conveying a portion of the air discharged by said turbine to said first heat exchanger to supply cooling air thereto; power generating means coupled to said motor means and driven thereby, said power generating means supplying power to the equipment in the compartment; a circulating fan coupled to said power generating means and driven thereby; second duct means extending from the compartment to said fan and back to the compartment whereby said fan may recirculate the atmosphere within the compartment; a second heat exchanger in said second duct means for cooling the recirculated compartment air; and third duct means for conveying a portion of the air discharged by said turbine to said second heat exchanger to supply cooling air thereto.*

*14. A system for cooling the atmosphere within the compartment of an aircraft and for generating power, the compartment containing power actuated equipment, said system comprising: a ram air turbine exposed to the air stream of the aircraft; a fluid pumping means driven by said turbine for supplying fluid under pressure; fluid motor means; means connecting said pumping means to said motor means for supplying said fluid under pressure to said motor means; a return connection for returning the fluid from said motor means to said pumping means; a pressurized sump in said return connection; a first heat exchanger in said return connection; first duct means for conveying a portion of the air discharged by said turbine to said first heat exchanger to supply cooling air thereto; power generating means coupled to said motor means and driven thereby, said power generating means supplying power to the equipment in the compartment; means for controlling the speed of said power generating means within predetermined limits including valve means for bypassing fluid directly from said pumping means to said sump; a circulating fan coupled to said power generating means and driven thereby; second duct means extending from the compartment to said fan and back to the compartment whereby said fan may recirculate the atmosphere within the compartment; a second heat exchanger in said second duct means for cooling the recirculated compartment air; and third duct means for conveying a portion of the air discharged by said turbine to said second heat exchanger to supply cooling air thereto.*

*15. A circulating system for the atmosphere in a closed compartment of an aircraft, said system comprising: a ram air turbine exposed to the air stream of the aircraft; a circulating fan receiving power from said turbine and driven thereby; means for controlling the speed of said fan within predetermined limits; and duct means extending from the compartment to said fan and back to the compartment, whereby said fan may recirculate the atmosphere within the compartment.*

*16. A cooling system for the atmosphere in a closed compartment of an aircraft, said system comprising: a ram air turbine exposed to the airstream of the aircraft; a circulating fan receiving power from said turbine and driven thereby; means for controlling the speed of said fan within predetermined limits; duct means extending from the compartment to said fan and back to the compartment, whereby said fan may recirculate the atmosphere within the compartment; and cooling means in said duct means.*

*17. A cooling system for the atmosphere in a closed compartment of an aircraft, said system comprising: a ram air turbine exposed to the airstream of the aircraft; a circulating fan receiving power from said turbine and driven thereby; means for controlling the speed of said fan within predetermined limits; duct means extending from the compartment to said fan and back to the compartment, whereby said fan may recirculate the atmosphere within the compartment; a heat exchanger in said duct means for cooling the recirculated compartment air; and additional duct means for conveying a portion of the air discharged by said turbine to said heat exchanger to supply cooling air thereto.*

*18. A system for cooling the atmosphere within a compartment of an aircraft and for generating power, the compartment containing power actuated equipment, said system comprising: a ram air turbine exposed to the air stream of the aircraft; power generating means coupled to said turbine and driven thereby, said power generating means supplying power to the equipment in the compartment; a circulating fan coupled to said power generating means and driven thereby; and duct means extending from the compartment to said fan and back to the compartment whereby said fan may recirculate the atmosphere within the compartment.*

*19. A system for cooling the atmosphere within a compartment of an aircraft and for generating power, the compartment containing power actuated equipment, said system comprising: a ram air turbine exposed to the air stream of the aircraft; power generating means coupled to said turbine and driven thereby, said power generating means supplying power to the equipment in the compartment; a circulating fan coupled to said power generating means and driven thereby; duct means extending from the compartment to said fan and back to the compartment whereby said fan may recirculate the atmosphere within the compartment; and cooling means in said duct means.*

*20. A system for cooling the atmosphere within a compartment of an aircraft and for generating power, the compartment containing power actuated equipment, said system comprising: a ram air turbine exposed to the air*

*stream of the aircraft; power generating means coupled to said turbine and driven thereby, said power generating means supplying power to the equipment in the compartment; a circulating fan coupled to said power generating means and driven thereby; duct means extending from the compartment to said fan and back to the compartment whereby said fan may recirculate the atmosphere within the compartment; a heat exchanger in said duct means for cooling the recirculated compartment air; and additional duct means for conveying a portion of the air discharged by said turbine to said heat exchanger to supply cooling air thereto.*

*21. A cooling system for the atmosphere in a closed compartment of an aircraft, said system comprising: a ram air turbine exposed to the air stream of the aircraft; fluid pumping means driven by said turbine; fluid motor means; fluid passage means extending from said pumping means to said motor means and back to said pumping means whereby said motor means may be driven by said pumping means; a first heat exchanger in said fluid passage means; first duct means conveying a portion of the air discharged by said turbine to said first heat exchanger to supply cooling air thereto; a circulating fan coupled to said motor means and driven thereby; second duct means extending from the compartment to said fan and back to the compartment, whereby said fan may recirculate the atmosphere within the compartment; a second heat exchanger in said second duct means for cooling the recirculated compartment air; and third duct means for conveying a portion of the air discharged by said turbine to said second heat exchanger to supply cooling air thereto.*

*22. A cooling system for the atmosphere in a closed compartment of an aircraft, said system comprising: a ram air turbine exposed to the air stream of the aircraft; fluid pumping means driven by said turbine; fluid motor means; fluid passage means extending from said pumping means to said motor means and back to said pumping means whereby said motor means may be driven by said pumping means; means for controlling the speed of said motor means within predetermined limits; a first heat exchanger in said fluid passage means; first duct means conveying a portion of the air discharged by said turbine to said first heat exchanger to supply cooling air thereto; a circulating fan coupled to said motor means and driven thereby; second duct means extending from the compartment to said fan and back to the compartment whereby said fan may recirculate to atmosphere within the compartment; a second heat exchanger in said second duct means for cooling the recirculated compartment air; and third duct means for conveying a portion of the air discharged by said turbine to said second heat exchanger to supply cooling air thereto.*

*23. A system for cooling the atmosphere within a compartment of an aircraft and for generating power, the compartment containing power actuated equipment, said system comprising: a ram air turbine exposed to the air stream of the aircraft; power generating means coupled to said turbine and driven thereby, said power generating means supplying power to the equipment in the compartment; means for controlling the speed of said power generating means within predetermined limits; a circulating fan coupled to said power generating means and driven thereby; duct means extending from the compartment to said fan and back to the compartment whereby said fan may recirculate the atmosphere within the compartment; a heat exchanger in said duct means for cooling the recirculated compartment air; and additional duct means for conveying a portion of the air discharged by said turbine to said heat exchanger to supply cooling air thereto.*

References Cited in the file of this patent or the original patent

UNITED STATES PATENTS

| | | |
|---|---|---|
| 2,453,923 | Mayo | Nov. 6, 1948 |
| 2,485,522 | Anderson | Oct. 18, 1949 |